Figure 1:
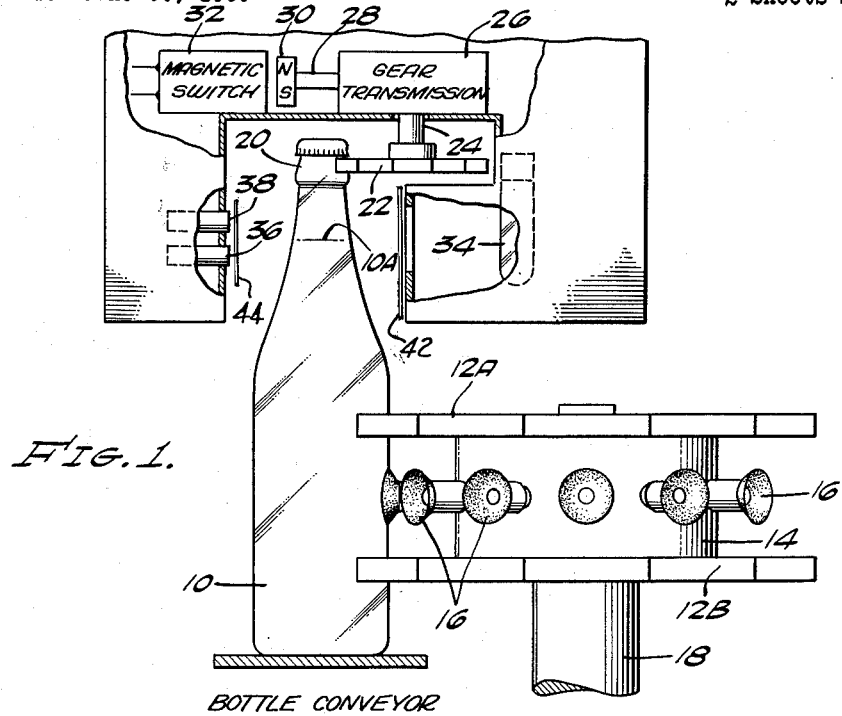

June 18, 1963 J. H. WYMAN 3,094,213
FILL-HEIGHT INSPECTION DEVICE FOR FLUID IN BOTTLES
Filed June 30, 1960 2 Sheets-Sheet 1

BOTTLE CONVEYOR

JAMES H. WYMAN
INVENTOR.

BY Lyon & Lyon

ATTORNEYS

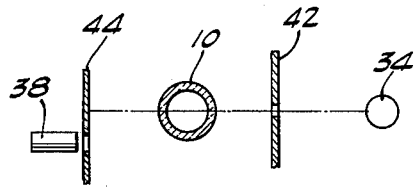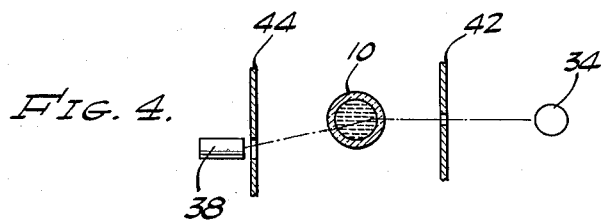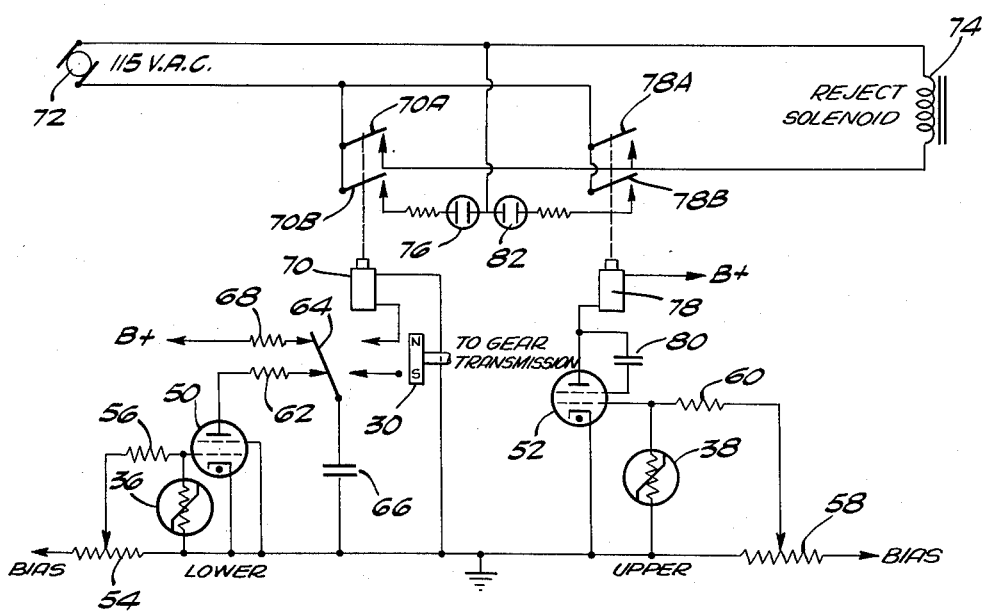

# United States Patent Office 3,094,213
Patented June 18, 1963

3,094,213
FILL-HEIGHT INSPECTION DEVICE FOR FLUID IN BOTTLES
James H. Wyman, San Pedro, Los Angeles, Calif., assignor to Industrial Automation Corp., Pasadena, Calif., a corporation of California
Filed June 30, 1960, Ser. No. 40,002
3 Claims. (Cl. 209—111.5)

This invention relates to inspection apparatus of the type used to determine whether a transparent container, such as a bottle, has been filled to the proper height with a liquid, and, more particularly, to improvements therein.

The requirement that the volume of beverage in a bottle correspond to the volume specified on the label on the bottle is a legal one. Good customer relations also provide more incentive to a bottler of liquids which require him to make sure that the contents of the bottle are as specified. On the other hand, should more than the specified amount of liquid be poured into the bottles, the bottler suffers an economic loss. Thus, a number of different systems have been proposed which inspect translucent containers, such as bottles, to determine whether the fill-height of the bottle is proper. These systems usually apply radiation on one side of the bottle and a detector on the other side of the bottle in the region of the bottle wherein desired fill-height occurs. However, due to various factors, such as the differences in bottle thickness, bottle color, variations in beverage color, as well as the presence of foam in many beverages, none of the heretofore-produced systems have proven consistently satisfactory.

An object of this invention is to provide a fill-height inspection system which is not adversely affected by variations in bottle thickness or color.

Another object of this invention is the provision of a fill-height inspection system which is not adversely affected by differences in beverage color or the presence of foam.

Yet another object of the present invention is the provision of a novel and unique fill-height inspection system.

These and other objects of the invention are achieved by taking advantage of the fact that light is refracted or bent at a unique angle by the liquid and its container. Thus, if a photocell is positioned on one side of a container so that no illumination from a light source can reach that photocell, unless it is refracted by the liquid in the container, a positive arrangement for detecting the fill-height of the liquid in the container may be obtained. The photocell is positioned adjacent the container at a level just below the minimum acceptable level. Similarly, to determine whether a container has been overfilled, a photocell may be positioned adjacent the container just above the maximum desired fill-height level, to be illuminated only by light which is refracted by the liquid in the bottle.

Figures 2A, 2B, 2C:
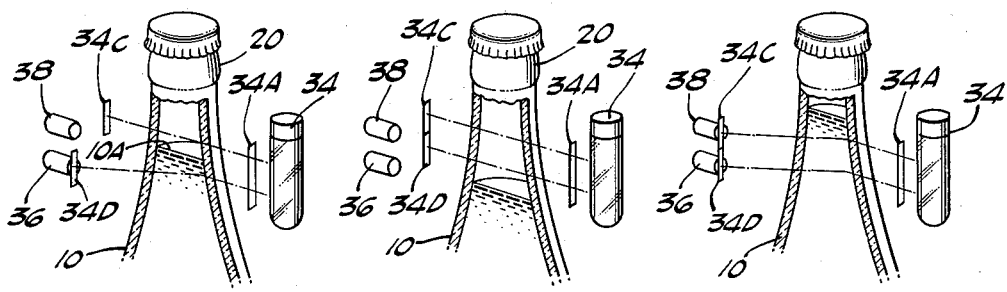

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 illustrates the disposition of the apparatus in accordance with this invention at an inspection station;

FIGURES 2A, 2B, 2C, as well as FIGURES 3 and 4, are fragmentary views of apparatus in accordance with this invention, which are shown for illustrating the principles of the invention; and FIGURE 5 is a circuit diagram of apparatus employed in accordance with this invention.

This invention will be described as a system for determining whether or not a bottle has been filled with a liquid within predetermined fill-height limits. This should not be construed as a limitation upon the invention, since it will be obvious to those skilled in the art that the principles described herein are applicable to substantially any situation wherein a translucent container is employed and it is desired to fill that container with a liquid to a predetermined level or within predetermined limits.

In FIGURE 1, a bottle 10 is shown at an inspection station. The apparatus required for transporting bottles into and out of such inspections is well known and exemplified, for example, in Patent No. 2,800,226. The system described in this patent includes, in addition to an arrangement for transporting bottles into and out of an inspection station, a system for preventing bottles, which are rejected by the inspection apparatus, from being returned to the regular conveyor line. This apparatus is briefly shown in FIGURE 1 and consists of a pair of wheels 12A, 12B, which are mounted on both sides of a cylinder 14. These wheels have semicircular pockets in their peripheral portions, which are contoured to fit against the side of the bottle. Within the cylinder 14 there is provided a plurality of suction cups 16. The cylinder, as well as the cups, are mounted on a rotating shaft 18. Within the shaft and the cylinder is a mechanism which, when actuated, can apply a vacuum to the one of the cups 16 which is in contact with a bottle 10 in the inspection zone, or just immediately after it passes from the inspection zone. Thereby, when a bottle is rejected, it is held by the cup and carried to a reject-bottle accumulator, rather than being released to be passed on to the regular conveyor.

In addition to the bottle being engaged by the wheels 12A and 12B, the top of the bottle, and, more specifically, the crown-finish portion 20, is engaged by a smaller starwheel 22, which engages the crown-finish portion 20. As the bottle moves through and beyond the inspection zone, the starwheel 22 is rotated thereby. This results in turning a shaft 24 which holds the wheel 22 in engagement with the bottle. The shaft 24, through a gear transmission 26, transmits the rotational motion to an output shaft 28. Upon this shaft is mounted a permanent magnet 30. This permanent magnet rotates with the shaft in proximity to a magnetic switch 32. The magnetic switch is of a type which is commercially available and which includes contacts which, when the permanent magnet 30 assumes a predetermined orientation, are closed to an operating position—otherwise, the contacts are left in a non-operating position. The significance of the operation of the magnetic switch 30 will become more clear as this description progresses.

On one side of the inspection zone there is positioned a source of light 34. On the other side of the inspection zone there are positioned two photocells 36 and 38. Photocell 36 is positioned just below the level of liquid 10A, in a bottle 10, which has been previously determined to be the minimum acceptable level. The photocell 38 is positioned just above the level of liquid in a bottle which has been previously determined as the maximum acceptable liquid level.

Reference is now made to FIGURES 2A, 2B, and 2C, as well as to FIGURES 3 and 4, which will illustrate the principles employed herein. FIGURE 2A shows conditions which occur when the liquid level is proper; FIGURE 2B shows conditions which occur when the liquid level is less than that desired; and FIGURE 2C shows conditions which occur when the liquid level exceeds the maximum desired. Light from the lamp 34 passes through a slotted mask, shown in FIGURES 3 and 4, to provide a narrow beam of light, such as represented by the rectangle 34A. This beam of light then illuminates the portion of the bottle desired to be inspected for proper fill-height. In FIGURE 2A the level of the liquid 10A is assumed to be within the predetermined proper fill-level limits. With this situation, the bottom of the portion of the beam light will pass through the bottle and through the liquid therein, and the upper portion will pass through the bottle above the liquid level. The portion of the beam which passes above the liquid level, represented by the rectangle 34C, is not refracted by the liquid, and thus does not impinge upon the photocell 38 which is positioned off the axis of an unrefracted beam passing through the bottle.

The portion of the beam 34A which passes through that portion of the bottle which contains the liquid is represented by the rectangle 34D. This light-beam portion is refracted by the liquid and will impinge upon the photocell 36, which is positioned to receive only the refracted light, and none other. Thus, a first condition for acceptance is provided. This is the condition where the photocell 38 is not illuminated when the bottle is in the inspection zone, and the photocell 36 is illuminated when the bottle is in the inspection zone.

In FIGURE 2B, a situation is shown where the liquid level is not equal to the minimum required level. In such a situation, the beam of light 34A is not refracted, and therefore leaves the bottle substantially on the same axis as it enters the bottle. In view of this fact, the beam portions 34C, 34D will not illuminate either of the photocells 38, 36. Thus, a condition for rejection of the bottle is that neither of the photoelectric cells will be illuminated when a bottle is in the inspection zone.

In FIGURE 2C, the condition is presented where the level of the liquid in the bottle exceeds the desired fill-height level. Here, the light beam 34A is refracted by the liquid in the bottle so that the beam portions 34C and 34D illuminate both of the photocells 38, 36. Thus, another condition for rejecting the bottle is presented wherein both of the photocells are illuminated when the bottle is in the inspection zone.

FIGURES 3 and 4 show what may be considered a plan view of any one of the arrangements in FIGURES 2A through 2C. The source of light 34 is provided with a mask 42 which forms the light from the source into a narrow beam. This beam passes through the bottle 10 and is substantially undeviated when there is no liquid in the beam path. The photocells are provided with a mask 44, which blocks off any light except that which is refracted by liquid in the bottle. FIGURE 4 shows the refracted light beam impinging upon the photocell 38. The variations in bottle thickness or color do not affect the angle of refraction of the light to any appreciable extent. For a liquid such as beer, this has been found to be on the order of 15 degrees.

The foam usually found on the top of beverages such as beer does not refract or transmit light to either of the photocells. Thus, foam does not violate the conditions of acceptance or rejection. Thus, the presence of foam, which causes other types of fill-height inspection devices to fail, is disregarded by the present invention in its determination as to whether or not a bottle has been filled to the proper level.

FIGURE 5 shows the electronic circuitry associated with the photocells to operate the reject mechanism. The photocells 36 and 38 are here connected between the control grids of the respective thyratron tubes 50, 52 and ground. A negative bias is connected through a potentiometer 54 and a fixed resistor 56 to the control grid of the tube 50. Another negative bias is connected through the potentiometer 58 and the fixed resistor 60 to the control grid of a gas tube 52. The potentiometers 54, 58 are used to set the bias-off levels of these tubes so that when the photoconductive devices 36, 38 are illuminated, the tubes 50, 52 are rendered conductive by reason of the reduction in the resistance of the devices 36, 38, which makes the control grids more positive.

The anode of tube 50 is connected through a resistor 62 and through the single-pole double-throw switch contact 64 to a capacitor 66. A source of operating potential is connected through a resistor 68, and through the switch arm 64 to the capacitor 66, and through the resistor 62 to the anode of tube 50.

The movable arm 64 is part of the magnetic switch 32 which has been described in connection with FIGURE 1. When the permanent magnet 30 assumes proper orientation, it attracts the switch arm 64 from the position shown in FIGURE 5 to connect the capacitor 66 to one side of a relay coil 70, the other side of which is connected to ground. Thus, in the standby condition, capacitor 66 is charged up through resistor 68. When a bottle enters the inspection zone, if the photocell 36 is illuminated, then the gas tube 50 is rendered conductive, thereby discharging capacitor 66. As the bottle passes through the inspection zone, the magnet 30 is oriented in a direction to operate switch arm 64 to the position where it will connect capacitor 66 to the relay 70. If the bottle was acceptable, the capacitor 66 has been discharged, and relay 70 is not operated. If the photocell 36 was not illuminated, indicative of the fact that the liquid in the bottle was less than the predetermined level, then capacitor 66 has not been discharged. As a result, the relay 70 is rendered operative, whereby its contacts 70A, 70B are operated to apply power from a source 72 to the solenoid 74, which operates the reject mechanism. Power also is applied to a light 76, which indicates that a bottle is being rejected because the fill-height is insufficient.

If, while the bottle is in the inspection zone, the photocell 38 is illuminated, indicative of the fact that the bottle has been filled to too high a level, gas tube 52 is rendered conductive. It thereby draws current through a relay coil 78, causing the relay to become operative. The capacitor 80 serves the function of maintaining the gas tube 52 conductive for a short interval to insure that the relay 78 has a chance to operate. The contacts 78A, 78B are closed by operation of the solenoid 78, whereby power is applied to the reject solenoid 74 and the light 82 is illuminated to indicate that the bottle is being rejected because it has been filled at too great a height. It should be appreciated that when the solenoid 74 has current applied thereto, it will operate mechanism which will apply a vacuum to whichever one of the vacuum cups 16 is in contact with the bottle 10, which is then passing through the bottle-inspection zone.

It will be appreciated that the index of refraction for different liquids is different. The liquid and its container act as a lens to focus the thin light beam. Therefore, for different runs of these bottled liquids, the position of the photocells must be adjusted to the position of best focus of the refracted beam, determined very simply by seeing what position of these photocells is necessary with the three conditions shown in FIGURES 2A, 2B, and 2C for illuminating the photocells with the liquid with which the bottles will be filled.

There has accordingly been described and shown herein a novel and useful arrangement for determining when a translucent container has been filled to the proper level by a liquid by employing the refractive properties of the liquid.

I claim:

1. A system for determining whether bottles passing through an inspection zone have been properly filled with a liquid comprising means at one side of said inspection zone for illuminating a predetermined region of a bottle to be inspected, photocell means, means positioning said photocell means at a side of said zone opposite to said one side at a location where only refracted light from liquid in said predetermined region will fall on said photocell means, a capacitor, means for charging up said capacitor, means responsive to said photocell being illuminated for discharging said capacitor, an inoperative bottle rejection apparatus, switch means connected to said capacitor, means responsive to a bottle passing from said inspection zone for operating said switch means to connect said capacitor to said bottle rejection apparatus to render it operative if said capacitor has not been discharged, a wheel having a plurality of notches in the periphery thereof each of which is adapted to engage a predetermined portion of a bottle, means for rotatably mounting said wheel for engaging said predetermined portion of each bottle passing through said inspection zone with a notch in said wheel periphery, a magnet, and means for rotating said magnet responsive to rotation of said wheel, said switch means including magnetic means for operating said switch responsive to a properly oriented magnetic field, and means for positioning said switch means adjacent said magnet to be responsive to its magnetic field when properly oriented.

2. A system for determining whether a bottle passing through an inspection zone has been properly filled with a liquid comprising means, at one side of said inspection zone, for illuminating the predetermined region of a bottle to be inspected, a first and second photocell means positioned at a side of said inspection zone opposite to said one side, said first photocell means being positioned to receive only refracted light from the liquid in a bottle at a level which is just below a predetermined minimum acceptable liquid level in said bottle, said second photocell means being positioned to receive only refracted light from the liquid in a bottle at a level which just exceeds a predetermined maximum acceptable liquid level in said bottle, inoperative bottle-rejecting means, means responsive to illumination of said second photocell means when a bottle is in said inspection zone for operating said bottle-rejecting means, and means responsive to a failure to illuminate said first photocell means when a bottle is in said inspection zone for activating said bottle-rejecting means, a capacitor, means for charging up said capacitor, a means responsive to said photocell being illuminated for discharging said capacitor, a single-pole double-throw switch means having a standby position for connecting to said capacitor said means for charging up said capacitor and said means responsive to said photocell being illuminated for discharging said capacitor and having an operated position for connecting said capacitor to said bottle-rejecting means, and means for operating said switch means to its operated position as a bottle leaves said inspection zone whereby said bottle-rejecting means is operated if said capacitor has not been discharged.

3. A system as recited in claim 2 wherein said means for operating said switch means to its operated position as a bottle leaves said inspection zone comprises a wheel having a plurality of notches in the periphery thereof each of which engages the crown-finish region of a bottle, means for rotatably mounting said wheel for engaging said crown-finish region of each bottle passing through said inspection zone with a notch in said wheel periphery, a magnet, and means for rotating said magnet responsive to rotation of said wheel, said switch means including magnetic means for moving said switch means to its operated position responsive to a properly oriented magnetic field, and means for positioning said switch means adjacent said magnet to be responsive to its magnetic field when properly oriented.

References Cited in the file of this patent

UNITED STATES PATENTS

| | | |
|---|---|---|
| 1,737,126 | Reyling | Nov. 26, 1929 |
| 2,085,671 | Powers | June 29, 1937 |
| 2,415,714 | Hurley | Feb. 4, 1947 |
| 2,800,226 | Drennan | Apr. 23, 1957 |
| 2,990,952 | Nigrelli | July 4, 1961 |
| 3,038,606 | Leaver | June 12, 1962 |